(12) United States Patent
Louis

(10) Patent No.: US 12,095,279 B2
(45) Date of Patent: *Sep. 17, 2024

(54) SOFT MAGNETIC RING FOR WIRELESS POWER DEVICES

(71) Applicant: Apple Inc., Cupertino, CA (US)

(72) Inventor: Jeffrey D. Louis, Chatswood (NZ)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,864

(22) Filed: Nov. 17, 2023

(65) Prior Publication Data

US 2024/0088714 A1    Mar. 14, 2024

Related U.S. Application Data

(63) Continuation of application No. 17/380,957, filed on Jul. 20, 2021, now Pat. No. 11,862,985.

(60) Provisional application No. 63/211,700, filed on Jun. 17, 2021.

(51) Int. Cl.
| | |
|---|---|
| *H01M 10/46* | (2006.01) |
| *H01F 1/147* | (2006.01) |
| *H01F 38/14* | (2006.01) |
| *H02J 7/00* | (2006.01) |
| *H02J 7/02* | (2016.01) |
| *H02J 50/10* | (2016.01) |

(52) U.S. Cl.
CPC .............. *H02J 50/10* (2016.02); *H01F 1/147* (2013.01); *H01F 38/14* (2013.01); *H02J 7/00032* (2020.01); *H02J 7/02* (2013.01)

(58) Field of Classification Search
CPC . H01F 1/147; H01F 1/34; H01F 38/14; H01F 7/0247; H02J 7/02; H02J 7/00032; H02J 7/0048; H02J 7/00045; H02J 50/10; H02J 50/80; H02J 50/90; H02J 50/005
USPC ........ 320/106, 107, 108, 114, 115, 132, 149
See application file for complete search history.

(56) References Cited

U.S. PATENT DOCUMENTS

| | | | |
|---|---|---|---|
| 9,276,437 B2 | 3/2016 | Partovi et al. | |
| 9,977,205 B2 | 5/2018 | Williams et al. | |
| 10,599,101 B2 | 3/2020 | Rothkopf et al. | |
| 11,862,985 B2 * | 1/2024 | Louis | H01F 7/0247 |
| 2017/0170678 A1 | 6/2017 | Uhm | |
| 2020/0065536 A1 | 2/2020 | Utykanski | |

(Continued)

FOREIGN PATENT DOCUMENTS

| | | |
|---|---|---|
| CN | 112271825 A | 1/2021 |
| CN | 212304889 U | 1/2021 |

*Primary Examiner* — Edward Tso
(74) *Attorney, Agent, or Firm* — Treyz Law Group; Jason Tsai

(57) ABSTRACT

A device or an accessory may include a near-field communications antenna and a soft magnetic ring concentric with the near-field communications antenna. The device or accessory may further include at least one wireless power transfer coil concentric with the near-field communications antenna, a rectifier coupled to the at least one wireless power transfer coil, and a battery configured to receive a rectified voltage from the rectifier. The soft magnetic ring may be used to shunt magnetic flux from one or more nearby magnets in external electronic devices to prevent the magnets from repelling each other. The soft magnetic ring may be attracted to a magnet in an external device to help align wireless power transfer coils in the two mated devices.

20 Claims, 13 Drawing Sheets

(56) References Cited

U.S. PATENT DOCUMENTS

| | | |
|---|---|---|
| 2020/0098498 A1 | 3/2020 | Mora et al. |
| 2020/0227935 A1 | 7/2020 | Mehta et al. |
| 2021/0044147 A9 | 2/2021 | Partovi et al. |
| 2021/0399577 A1 | 12/2021 | Qiu et al. |

\* cited by examiner

SOFT MAGNETIC RING FOR WIRELESS POWER DEVICES

This application is a continuation of patent application Ser. No. 17/380,957, filed Jul. 20, 2021, which claims the benefit of provisional patent application No. 63/211,700, filed Jun. 17, 2021, which are hereby incorporated by reference herein in their entireties.

FIELD

This relates generally to power systems, and, more particularly, to wireless power systems for charging electronic devices.

BACKGROUND

In a wireless charging system, a wireless power transmitting device wirelessly transmits power to a wireless power receiving device. Magnets may be used to align the wireless power transmitting device and wireless power receiving device with each other.

During operation, the wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

Power may be transmitted wirelessly between electronic devices. Devices such as cellular telephones, wireless charging pucks, battery cases, and other equipment may have wireless power coils. The coils in devices that transmit and receive power can be aligned magnetically. Proper operation may be ensured by aligning the coil in a device that is wirelessly transmitting power to an overlapping coil in a device that is wirelessly receiving power. To magnetically align and attach first and second devices for power transfer between their coils, the first and second devices may be provided with respective mating alignment magnets. The alignment magnets may be arranged in patterns such as rings.

In accordance with some embodiments, a device having a soft magnetic ring may be interposed between two external devices of the same type or model. The external devices may each have an alignment magnet. A first external device has a rear face that mates with a first face of the device. A second external device has a rear face that mates with a second face of the device. Mated in this way, the soft magnetic ring in the device shunts magnetic flux from the magnet in the first external device while shunting magnetic flux from the magnet in the second external device to prevent the two magnets from repelling one another. The device may further include at least one wireless charging coil concentric with the soft magnetic ring and a near-field communications antenna concentric with the soft magnetic ring. The device may be a battery case, a removable case, or other accessory.

In accordance with some embodiments, a device such as a cellular telephone may be provided with a soft magnetic ring. The device may further include a wireless charging coil concentric with the soft magnetic ring and a near-field communications antenna concentric with the soft magnetic ring. Such device may be directly mated with another device of the same type or model without the soft magnetic rings repelling each other. Such device may also be compatible with a wireless charging puck having a magnet.

DETAILED DESCRIPTION

A wireless power system includes electronic devices such as wrist watches, cellular telephones, tablet computers, laptop computers, removable cases, electronic device accessories, wireless charging mats, wireless charging pucks, and/or other electronic equipment. These electronic devices have wireless power circuitry. For example, an electronic device may have a wireless power coil. Some devices use wireless power coils for transmitting wireless power signals. Other devices use wireless power coils for receiving transmitted wireless power signals. If desired, some of the devices in a wireless power system may have both the ability to transmit wireless signals and to receive wireless signals. A cellular telephone or other portable electronic device may, as an example, have a coil that can be used to receive wireless power signals from a charging puck or other wireless transmitting device and that can also be used to transmit wireless power to another wireless power device (e.g., another cellular telephone). A device with one or more wireless power coils that is used for transmitting and/or receiving wireless power signals may be referred to as a wireless power device. Devices with power transmitting capabilities may sometimes be referred to as wireless power transmitting devices or wireless power devices. Devices with power receiving capabilities may sometimes be referred to as wireless power receiving devices or wireless power devices.

Figure 1:
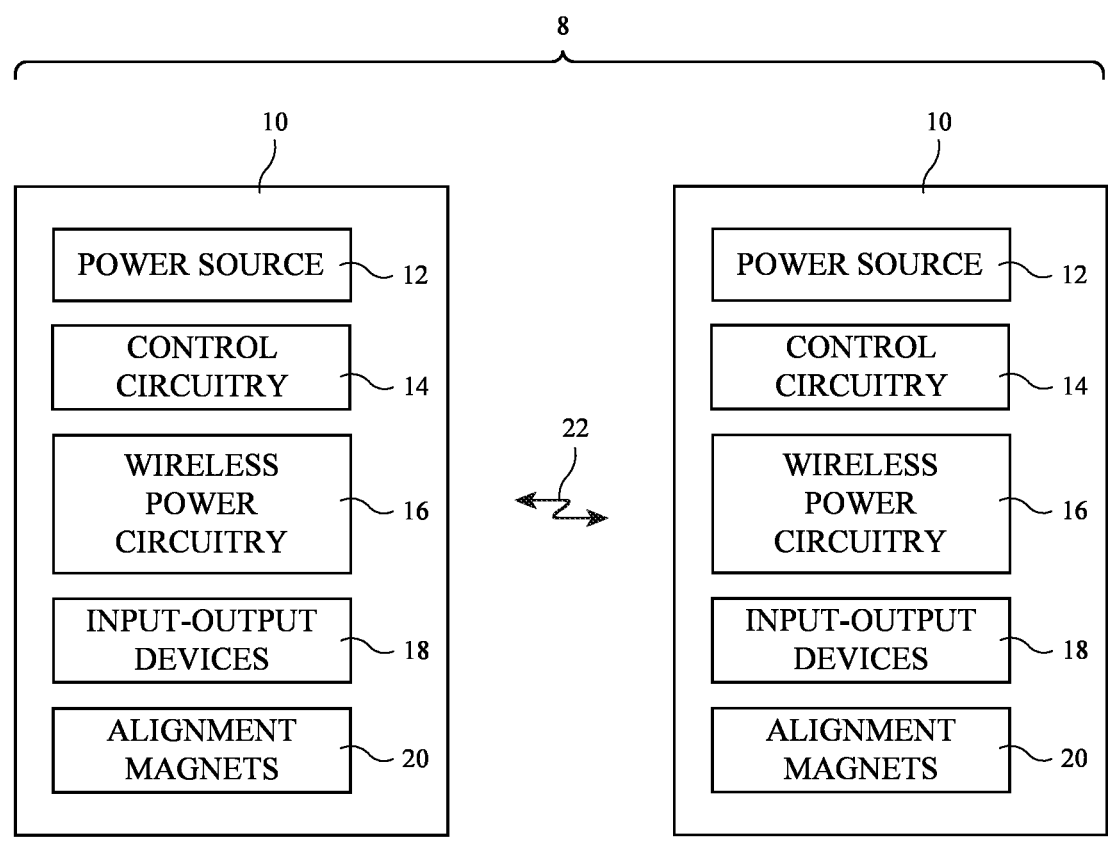
FIG. 1 is a schematic diagram of an illustrative wireless power system in accordance with some embodiments.

A wireless power system containing two or more wireless power devices is shown in FIG. 1. As shown in FIG. 1, wireless power system 8 may include wireless power devices 10. Each wireless power device in system 8 may include a housing containing one or more components such as power source 12, control circuitry 14, wireless power circuitry 16, input-output devices 18, and alignment magnets 20. The housing may be formed from polymer, metal, glass, ceramic, other materials, and/or combinations of these materials.

Power source 12 may include an alternating-current-to-direct-current power adapter that converts wall power (mains power) from an alternating-current source to direct-current power to power the circuitry of device 10 and/or may include a source of direct-current power such as a battery. If desired, devices with batteries can be wirelessly charged by receiving wireless power signals from a wireless power transmitting device.

Control circuitry 14 in each device 10 of system 8 is used in controlling the operation of system 8. This control circuitry may include processing circuitry associated with microprocessors, power management units, baseband processors, digital signal processors, microcontrollers, system(s) on chips (SoCs), and/or application-specific integrated circuits with processing circuits. The processing circuitry implements desired control and communications features in devices 10. For example, the processing circuitry may be used in processing user input, handling negotiations between devices 10, sending and receiving in-band and out-of-band data, making measurements, estimating power losses, determining power transmission levels, and otherwise controlling the operation of system 8.

Control circuitry 14 in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, a central processing unit (CPU) or other processing circuitry.

Devices 10 use wireless power circuitry 16 to transmit and/or receive wireless power signals 22 between devices 10. Wireless power circuitry 16 of each device 10 may include one or more coils. Configurations in which each device 10 has a single coil may sometimes be described herein as an example.

Each device 10 in system 10 may have optional input-output devices 18. Input-output devices 18 may include input devices for gathering user input and/or making environmental measurements and may include output devices for providing a user with output. As an example, input-output devices 18 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices.

Input-output devices 18 may also include sensors for gathering input from a user and/or for making measurements of the surroundings of system 8. Illustrative sensors that may be included in input-output devices 18 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Each device 10 may omit some or all of devices 18 or may include one or more of devices 18.

Input-output devices 18 may also include wireless communications circuitry such as radio-frequency (RF) communications circuitry and near-field communications (NFC) circuitry. Data conveyed using these NFC components may be considered out-of-band signals and may be radiated using a separate NFC antenna within each device. NFC circuitry may include circuitry that operates as an NFC reader (sometimes referred to as a proximity coupling device or PCD) and/or as an NFC tag (sometimes referred to as a proximity inductive coupling card or PICC). An NFC tag may be active or passive. An active NFC tag can actively transmit a signal to the NFC reader, whereas a passive NFC tag modulates the carrier waveform transmitted by the NFC reader. Exemplary NFC communications operate at 13.56 MHz. In some embodiments, NFC communications may employ millimeter/centimeter wave technologies at 10 GHz or above (to about 300 GHz).

Devices 10 in system 8 have alignment magnets 20 to facilitate magnetic attachment and alignment of a pair of devices 10 to each other. For example, each device 10 may have magnets 20 that help align that device 10 to another device so that the coils in each respective device overlap and are positioned for wireless power transfer. The use of magnets 20 for coil alignment allows power to be transferred satisfactorily between devices 10.

Figure 2:
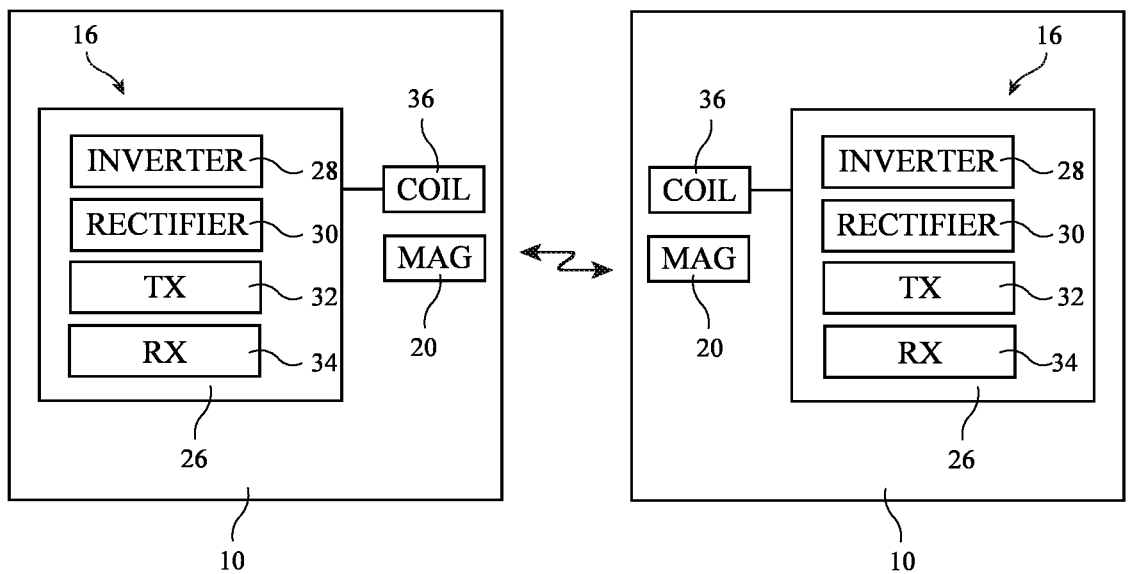
FIG. 2 is a schematic diagram of illustrative wireless power circuitry in a pair of mated electronic devices in accordance with some embodiments.

As shown in FIG. 2, wireless power circuitry 16 may include wireless power coils 36 coupled to corresponding power and communications circuitry 26. There may be one or more coils 36 in each device 10. For example, devices 10 may each include a single coil and/or one or more devices 10 in system 8 may include multiple coils 36. In arrangements in which devices 10 have more than one coil 36, coils 36 may be arranged in a two-dimensional array (e.g., a two-dimensional array of overlapping coils that cover a charging surface) and/or may be stacked on top of each other (e.g., to allow wireless signals to be transmitted and/or received on opposing sides of a device). To facilitate transmission of wireless power between a first device and a second device, the coils of the first and second devices may be placed adjacent to each other (e.g., a coil in the first device may overlap and be aligned with a corresponding coil in a second device).

Power and communications circuitry 26 may include inverters 28 and rectifiers 30. Circuitry 26 may also include communications circuitry such as transmitters 32 and receivers 34. When it is desired to transmit power wirelessly, the inverter 28 in a transmitting device may provide alternating-current signals (currents) to a corresponding coil 36 in the transmitting device. These alternating-current signals may have frequencies of 50 kHz to 1 MHz, 100-250 kHz at least 100 kHz, less than 500 kHz, or other suitable frequency. As alternating-current signals flow through the coil 36 in the transmitting device, alternating-current electromagnetic signals (e.g., magnetic field or magnetic flux signals) are generated and are received by an adjacent coil 36 in a receiving device. This induces alternating-current signals (currents) in the coil 36 of the receiving device that are rectified into direct-current power by a corresponding rectifier 30 in the receiving device. Rectifier 30 can provide the direct-current power to a load (e.g., a battery) or other electronic components within device 10. In arrangements in which devices 10 have both inverters and rectifiers, bidirectional power transfer is possible. Each device can transmit power using its inverter 28 or may receive power using its rectifier 30.

Transmitters 32 and receivers 34 may be used for wireless communications. In some embodiments, out-of-band communications (e.g., Bluetooth® communications and/or other wireless communications using radio-frequency antennas in one or more radio-frequency communications bands may be supported). In other embodiments, coils 36 may be used to transmit and/or receive in-band communications data. Any suitable modulation scheme may be used to support in-band communications, including analog modulation, frequency-shift keying (FSK), amplitude-shift keying (ASK), and/or phase-shift keying (PSK). In an illustrative embodiment, FSK communications and ASK communications are used in transmitting in-band communications traffic between devices 10 in system 8. A wireless power transmitting device may, as an example, use its transmitter 32 to impose frequency shifts onto the alternating-current signals being supplied by its inverter 28 to its coil 36 during wireless power transfer operations and a wireless power receiving device may use its coil 36 and its receiver 34 to receive these FSK signals. The receiving device in this scenario may use its transmitter 32 to modulate the impedance of its coil 36, thereby creating corresponding changes in the current flowing through the wireless power transmitting device coil that are detected and demodulated using the receiver 34 in the wireless power transmitting device. In this way, the transmitter 32 in the wireless power receiving device can use ASK communications to transmit in-band data to the receiver 34 in the wireless power transmitting device while wireless power is being conveyed from the wireless power transmitting device to the wireless power receiving device. In some embodiments, some devices 10 have both transmitters 32 and receivers 34 and other devices 10 have only transmitters 32 or have only receivers 34.

It is desirable for devices 10 to be able to communicate information such as received power, battery states of charge, power measurements, and so forth, to control wireless power transfer. The present technology contemplates avoidance of the transmission of personally identifiable information in order to provide wireless power transfer functions. Out of an abundance of caution, it is noted that to the extent that any implementation of this charging technology involves the use of personally identifiable information, for example during authentication, that implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

To ensure satisfactory wireless power transfer and in-band communications, devices 10 may have alignment magnets 20. The housings of devices 10 may be formed from metal, polymer, glass, and/or other materials through which direct-current magnetic fields from permanent magnets such as alignment magnets 20 may pass. Alignment magnets 20 can be used to help ensure alignment between coils 36 in paired (mated) devices. Magnets 20 may have ring shapes, or other suitable shapes, and may each include one more permanent magnet elements with magnetic pole pairs in locations that facilitate alignment and attachment of devices 10 to each other. As an example, magnets 20 may be configured so that when the magnet 20 in a first device is magnetically attached to a corresponding magnet 20 in a second device, coil 36 of the first device will be overlapped by and aligned with coil 36 of the second device.

Figure 3:
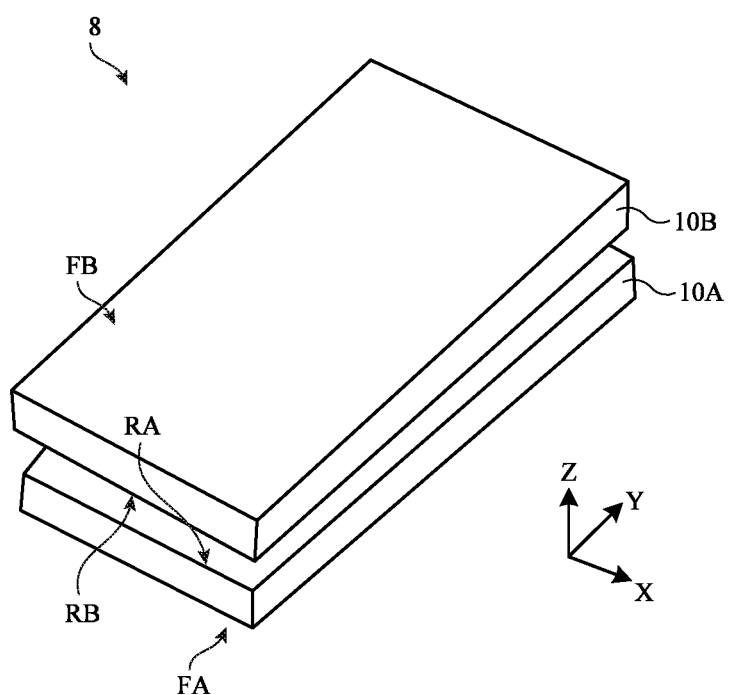
FIG. 3 is a perspective view of illustrative first and second electronic devices in a back-to-back configuration for wireless power transfer in accordance with some embodiments.

It may sometimes be desired to transfer power between two devices of the same type (e.g., first and second cellular telephones of the same model). Each device may have a coil mounted within the housing of the device. The coil may be mounted adjacent to the rear wall (back wall) of the housing and may be configured to transmit and receive wireless signals through the rear wall. The rear wall may, in an illustrative arrangement, be formed from a dielectric such as glass or polymer. When it is desired to transfer power between first and second devices, the second device may be placed on top of the first device in a back-to-back arrangement of the type shown in FIG. 3. As shown in the example of FIG. 3, first electronic device 10A has a front face (front) FA and an opposing rear face (rear or back) RA. Second electronic device 10B, which is resting on top of first device 10A in the orientation of FIG. 2, has a front face (front) FB and has an opposing rear face (rear or back) RB. Devices 10A and 10B each has a display at its front face. When placed back-to-back to align the respective coils of devices 10A and 10B, rear faces RA and RB face each other as shown in FIG. 3. Rear faces RA and RB may, for example, contact each other when devices 10A and 10B are mated.

Figure 4A:
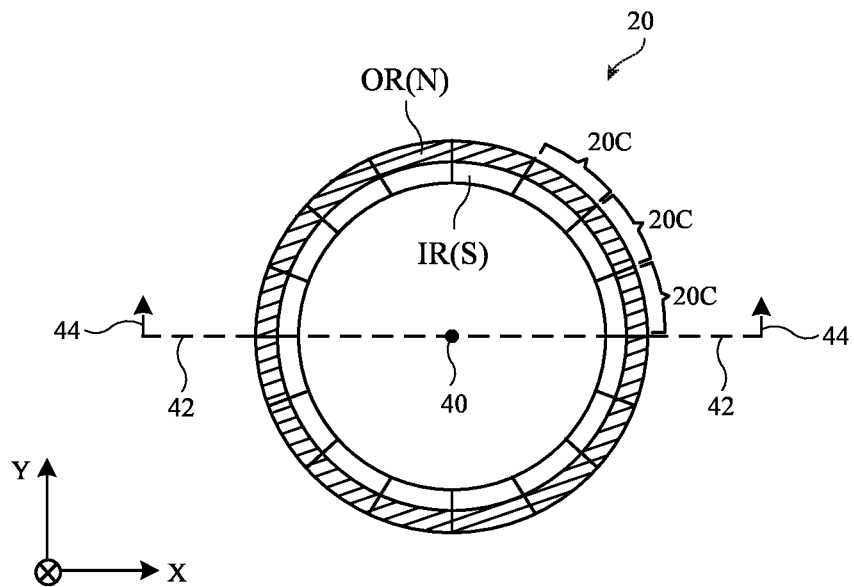
FIGS. 4A, 4B, 5A, and 5B are schematic diagrams of illustrative alignment magnet arrangements.

FIG. 4A is a top (front) view of electronic device alignment magnet 20 viewed from the front face of a device. As shown in FIG. 4A, magnet 20 has one or more permanent magnet elements 20C whose magnetic pole pairs are oriented in the X-Y plane such that magnetic poles common to each element are located in concentric inner and outer ring areas with opposite magnetic poles, where the inner ring area IR has a first magnetic polarity (south in the example of FIG. 4A) and the outer ring area OR has a second magnetic polarity (north in the example of FIG. 4A). The designations of N (to represent north poles) and S (to represent south poles) in FIGS. 4A and 4B and the other drawings are illustrative. It will be appreciated that throughout this description these designations can be reversed with no loss of generality (e.g., in any given embodiment S can be swapped for N and vice versa). This alignment magnet polarity pattern allows a device containing magnet 20 to magnetically attach to another device having a corresponding ring-shaped alignment magnet 20' with poles of opposite polarity (see, e.g., magnet 20' of FIG. 5A, in which inner and outer sets of vertical magnets are arranged in concentric circles so that inner ring area IR has an exposed pole of north polarity and outer ring area OR has an exposed pole of south polarity). Magnet 20 configured in this way is sometimes referred to as a ring-shaped magnet array.

Figure 4B:
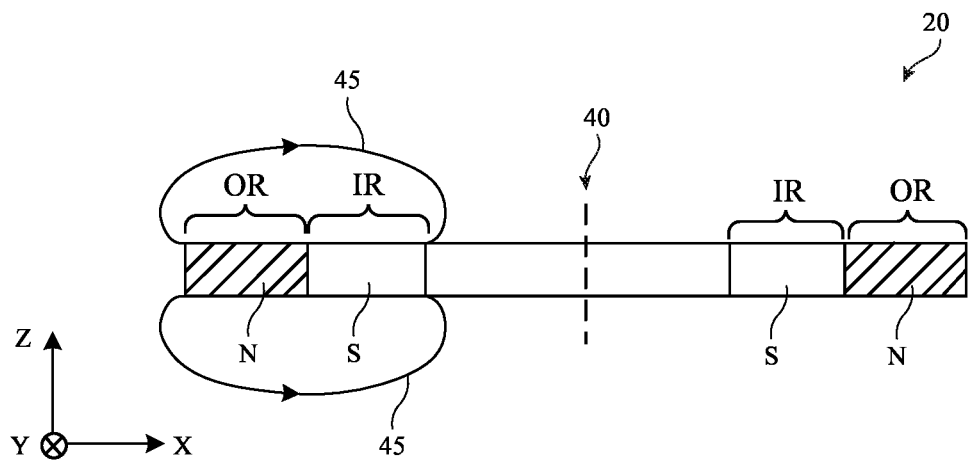

FIG. 4B is a cross-sectional side view of magnet 20 of FIG. 4A taken along line 42 of FIG. 4A and viewed in direction 44. As shown in FIG. 4B, magnets 20 produce a magnetic flux that is illustrated by magnetic field lines 45 originating from the north (N) pole to the south (S) pole. Magnetic field lines 45 emanating from the north pole may bend upward (or downward) in the Z direction and extend radially towards the center 40 of magnet 20 before bending downward (or upward) to terminate at the south pole.

Figure 5A:
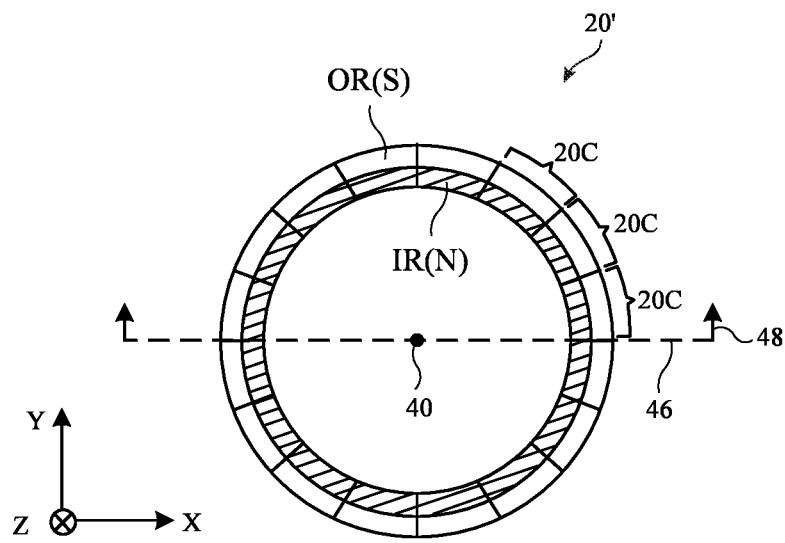

FIG. 5A is a top (front) view of an alignment magnet 20' in a wireless charging puck. As shown in FIG. 5A, magnet 20' has concentric inner and outer magnet ring areas with opposite magnetic poles, where the inner ring area IR has a first magnetic polarity (north in the example of FIG. 5A) and the outer ring area OR has a second magnetic polarity (south in the example of FIG. 5A). This alignment magnet polarity pattern allows a device containing magnet 20' to magnetically attach to another device having a corresponding ring-shaped alignment magnet 20 of the type shown in FIGS. 4A and 4B.

Figure 5B:
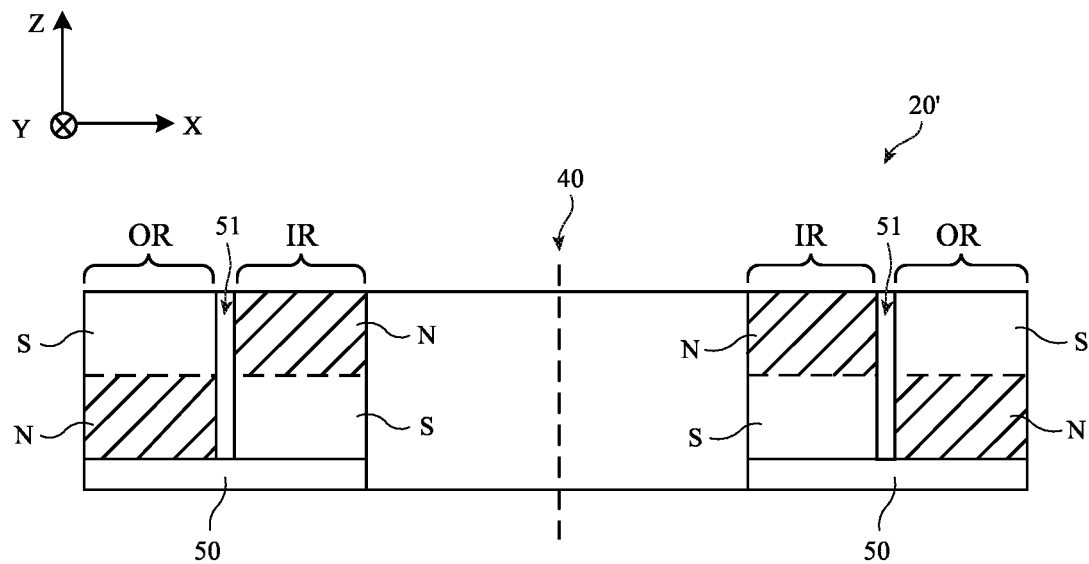

FIG. 5B is a cross-sectional side view of magnets 20' of FIG. 5A taken along line 46 of FIG. 5A and viewed in direction 48. As shown in FIG. 5B, magnet 20' of the charging puck may have one or more permanent magnet elements 20C that each consist of two vertically oriented (i.e. in the z-axis) magnet pole pairs that may exist in one homogeneous material or as two separate materials mounted together, each pole pair having a first pole stacked vertically (in the z-axis) on top of a second opposite pole such that the poles located at the uppermost surface in the z-axis (i.e. most positive z-axis value) are common to each permanent magnet element and determine the polarity of the corresponding outer ring area OR and inner ring area IR. The two vertically oriented magnet pole pairs in each magnet element 20C can be separated by a non-magnetized zone 51. This causes magnetic flux from magnets 20' to be oriented vertically at the uppermost surface in the z-axis (i.e. most positive z-axis value). Ferrite 50 helps confine magnetic flux at the bottoms of magnets 20' and may be composed of any magnetically soft material such as iron or an alloy of iron.

Although the arrangement of FIGS. 4A, 4B, 5A, and 5B allows an electronic device having magnet 20 to mate with a charging puck having magnet 20', first and second electronic devices with magnets 20 of the type shown in FIGS. 4A and 4B cannot mate with each other, because when the first and second electronic devices are placed back to back in an attempt to align magnets 20, the outer ring area OR consisting of north poles of the first electronic device will repel the corresponding outer ring area OR of north poles of the second electronic device. The south poles of the first and second devices will also repel each other when overlapping. As a result, two devices having identical magnets 20 may not be properly aligned for wireless charging between peer devices.

Figure 6A:
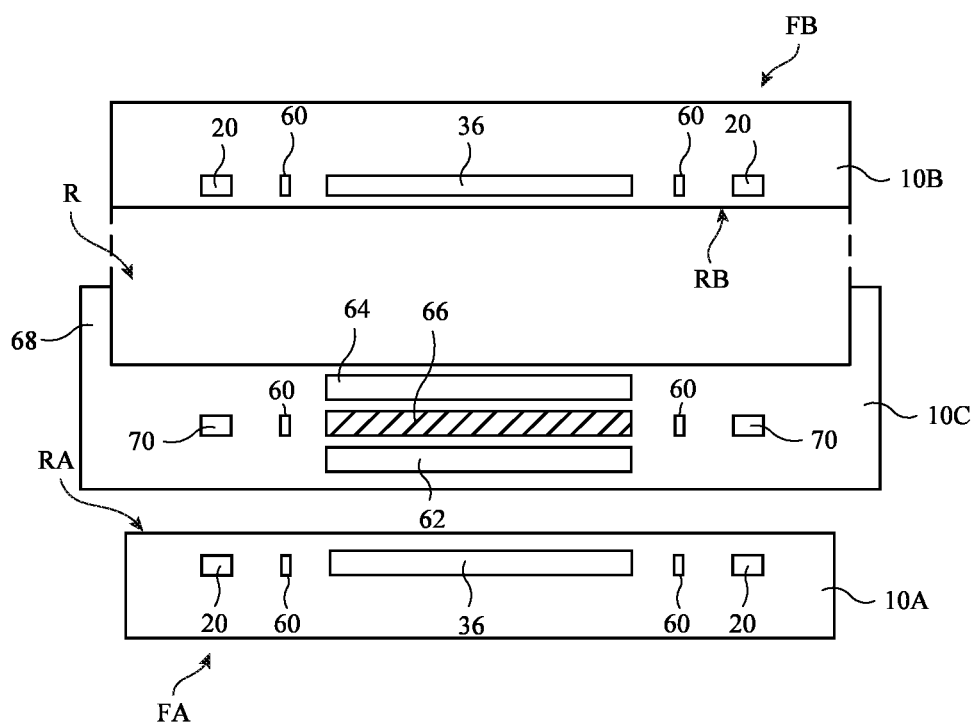
FIG. 6A is a cross-sectional side view of illustrative first and second electronic devices in a back-to-back configuration for wireless power transfer through an accessory having a soft magnetic ring in accordance with some embodiments.

Turning to FIG. 6A, devices 10 of system 8 may overcome this challenge by inserting a device with a soft magnetic ring between two devices having magnets 20 that would otherwise repel each other when placed in the back-to-back configuration. As shown in FIG. 6A, a first electronic device 10A may be oriented face down, a second electronic device 10B (i.e., an electronic device of the same type or model as device 10A) may be oriented face up, and a third device 10C may be interposed between devices 10A and 10B oriented in a back-to-back configuration. Devices 10A and 10B may each include a wireless power coil 36 (sometimes referred to as a wireless charging coil), a near-field communications (NFC) antenna 60 surrounding the wireless charging coil 36, and magnet 20 (see, e.g., magnet 20 of the type shown in FIGS. 4A and 4B) surrounding the near-field communications antenna 60. Coil 36, NFC antenna 60, and magnet 20 may be concentric annular (ring-like) structures. NFC antenna 60 may be used to transmit and/or receive out-of-band information between devices 10.

The example of FIG. 6A in which NFC antenna 60 is disposed between coil 36 and magnet 20 within devices 10A and 10B is merely illustrative. As another example, the position of magnet 20 and NFC antenna 60 can be swapped such that magnet 20 is interposed between coil 36 and antenna 60. As another example, the position of coil 36 and NFC antenna 60 can be swapped such that coil 36 is interposed between antenna 60 and magnet 20. As another example, coil 36 may surround magnet 20 while the NFC antenna 60 surrounds coil 36 such that magnet 20 runs along an inner peripheral edge of coil 36. As another example, the position of coil 36 and magnet 20 can be swapped such that coil 36 runs along an outer peripheral edge of NFC antenna 60. As yet another example, magnet 20 may surround NFC antenna 60 while coil 36 surrounds magnet 20 such that magnet 20 is interposed between an outer peripheral edge of NFC antenna 60 and an inner peripheral edge of coil 36. If desired, other non-concentric arrangements can also be used.

Device 10C may be a removable battery case (sometimes referred to as an external accessory or accessory device). Device 10C has a housing with a recess R and/or other structures configured to receive device 10B. In this way, a user may removably attach device 10B to device 10C so that devices 10B and 10C may be used together as a portable unit. Device 10C may provide supplemental power to device 10B while protecting device 10B from damage due to stress-producing events such as drop events when device 10B is installed on device 10C. This example in which device 10C has a protruding lip portion 68 shaped to receive the rear face of device 10B is merely illustrative. In other embodiments, device 10C may lack protruding portion 68 and may magnetically attach to device 10B using soft magnetic ring 70.

Device 10C may include two wireless power coils such as coils 62 and 64. During a bypass mode of operation, coils 62 and 64 are shorted together. Electrical components such as battery 66 may be interposed between coils 62 and 64. The shorting of coils 62 and 64 allows internal device components such as battery 18 to be effectively bypassed when wireless power is being conveyed between devices 10A and 10B. Devices 10A and 10B may transmit power and/or may receive wireless power (e.g., devices 10A and 10B may support bidirectional charging when placed in the back-to-back configuration). As an example, during a first wireless charging mode when device 10A is transmitting wireless power to device 10B, alternating current electromagnetic signals that are transmitted by coil 36 in device 10A are received by coil 62. Since coil 64 is shorted to coil 62 in this mode of operation, coil 64 emits electromagnetic signals that are received by coil 36 in device 10B. As another example, during a second wireless charging mode when device 10B is transmitting wireless power to device 10A, alternating current electromagnetic signals that are transmitted by coil 36 in device 10B are received by coil 64. Since coil 64 is shorted to coil 62 in this mode of operation, coil 62 emits electromagnetic signals that are received by coil 36 in device 10A.

Device 10C may include a near-field communications (NFC) antenna 60 surrounding coils 62 and 64. NFC antenna 60 may be used to convey information about device 10C to device 10B and/or device 10A. For example, antenna 60 may be configured to convey a device type (e.g., whether device 10C is a removable case or a wireless charging puck, etc.), a physical characteristic of the device such as the actual color of the device, a function of the device, or other information associated with that device.

In accordance with an embodiment, device 10C may further include a ring of soft magnetic material (see, e.g., ring 70) surrounding NFC antenna 60. Ring 70 may be formed from "soft" magnetic material(s), which are defined as magnetic materials that are easily magnetized and demagnetized. Unlike "hard" (permanent) magnets, which retain their magnetism and have poles that can attract opposite polarities and repel like polarities, soft magnetic materials only become magnetized (i.e. have a magnetic flux) when an external magnetic field is applied but do not retain their magnetism when the external magnetic field is removed. Ring 70 (sometimes referred to as a soft magnetic ring or a ring-like soft magnetic structure) is not a permanent magnet per se and does not have static poles, so it will not repel other magnets.

Soft magnetic materials are characterized by a high relative permeability (e.g., a relative permeability of at least 500, 500-1000, at least 1000, at least 10,000 or at least 100,000 or more), which measures how readily a material conducts magnetic flux due to an applied magnetic field. Ring 70 should also be formed from soft magnetic material with sufficient saturation flux density (e.g., a saturation flux density of at least 0.5 T, 0.5-1 T, 1-2 T, or more than 2 T), which measures the point at which the magnetic material cannot contain any more magnetic flux.

As examples, ring 70 may be formed from soft magnetic materials such as soft ferromagnetic (iron-based metal alloy) and/or soft ferrimagnetic (iron-based ceramic) materials, which may include pure iron annealed in hydrogen (which has a relative permeability of 200,000 and a saturation flux density of 2 T), pure iron without annealing (which has a relative permeability of 5,000 and a saturation flux density of 2.2 T), nickel (which has a relative permeability of 100-600 and a saturation flux density that is greater than ceramic ferrites), cobalt (which has a relative permeability of 18,000 and a saturation flux density of 1.2-1.8 T), nickel-plated steel, soft ferrite, steel, silicon steel (e.g., an iron alloy with 3-4% silicon), low carbon steel (e.g., an iron alloy with 0.2-0.4% carbon with a relatively permeability of 1000-3000 and a saturation density of 2.2 T), soft nanocrystalline ferrite material (which has a relative permeability of 10,000-100,000 or more and a saturation flux density of 1-2 T), Mu-metal ferromagnetic alloy (which has a relative permeability of 300,000-400,000 and a saturation flux density of 0.8-1.6 T), permalloy ferromagnetic alloy (which has a relative permeability of 10,000-100,000 or more and a saturation flux density of 0.6-1.2 T), some combination of these materials, and/or other suitable soft magnetic material with high relatively permeability and high saturation flux density.

Figure 6B:
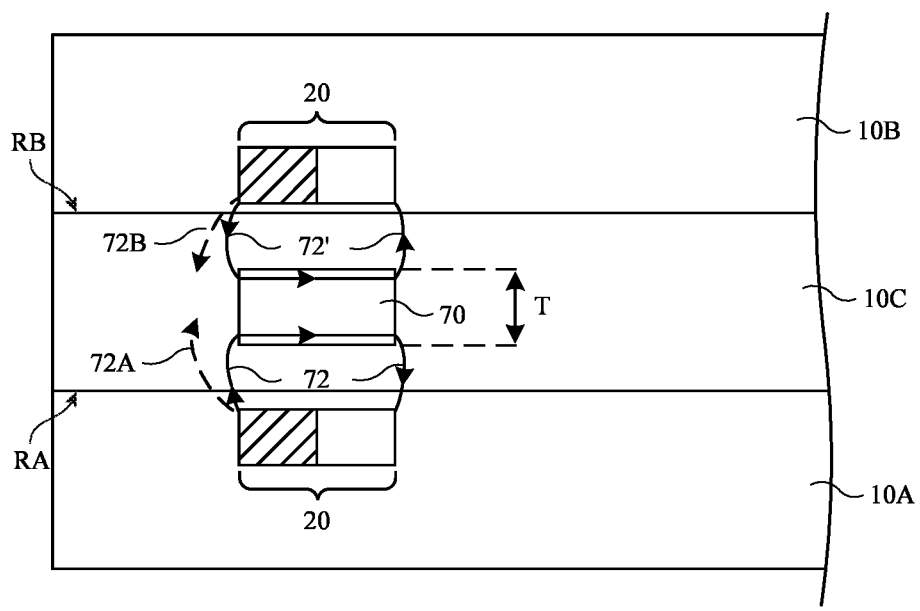
FIG. 6B shows how the soft magnetic ring in the accessory of FIG. 6A is used to shunt magnetic flux from magnets within the first and second electronic devices in accordance with some embodiments.

Ring 70 formed using soft magnetic material(s) with high relative permeability and high saturation flux density enables ring 70 to block and short out (shunt) magnetic flux emanating from nearby magnets while providing magnetic/mechanical attraction forces between ring 70 and the nearby magnets. FIG. 6B is a cross-sectional side view showing how soft magnetic ring 70 in device 10C is used to shunt magnetic flux from magnets 20 within electronic devices 10A and 10B when placed in the back-to-back configuration. Operated in this way, the wireless charging coil in device 10A will be properly aligned with the wireless charging coil in device 10B. Soft magnetic ring 70 may therefore sometimes be referred to as a magnetic flux shunting (shorting) structure or a magnetic field shunting (shorting) structure.

As shown in FIG. 6B, magnetic fields 72 from magnet 20 in device 10A will be shorted (shunted) by soft magnetic ring 70 (e.g., magnetic field line 72 originating from the north pole of magnet 20 travels upward towards an outer peripheral edge of ring 70, travels along the width of ring 70 towards the center of the device before exiting an inner peripheral edge of ring 70, and then travels downward towards the south pole of magnet 20). Similarly, magnetic fields 72' from magnet 20 in device 10B will also be shorted (shunted) by soft magnetic ring 70 (e.g., magnetic field line 72' originating from the north pole of magnet 20 travels downward towards an outer peripheral edge of ring 70, travels along the width of ring 70 towards the center of the device before exiting an inner peripheral edge of ring 70, and then travels upwards toward the south pole of magnet 20). If ring 70 had not been interposed between magnets 20, the magnetic field 72A emanating from magnet 20 in device 10A would repel the magnetic field 72B emanating from magnet 20 in device 10B, which would cause devices 10A and 10B to be misaligned. Ring 70 has a thickness T. Ring 70 that is thicker can hold more magnetic flux and is thus better at shielding and shunting magnetic fields from nearby magnets. Thickness T may, for example, be at least 0.5 mm, less than 0.5 mm, 0.5-1 mm, or greater than 1 mm.

Figure 6C:
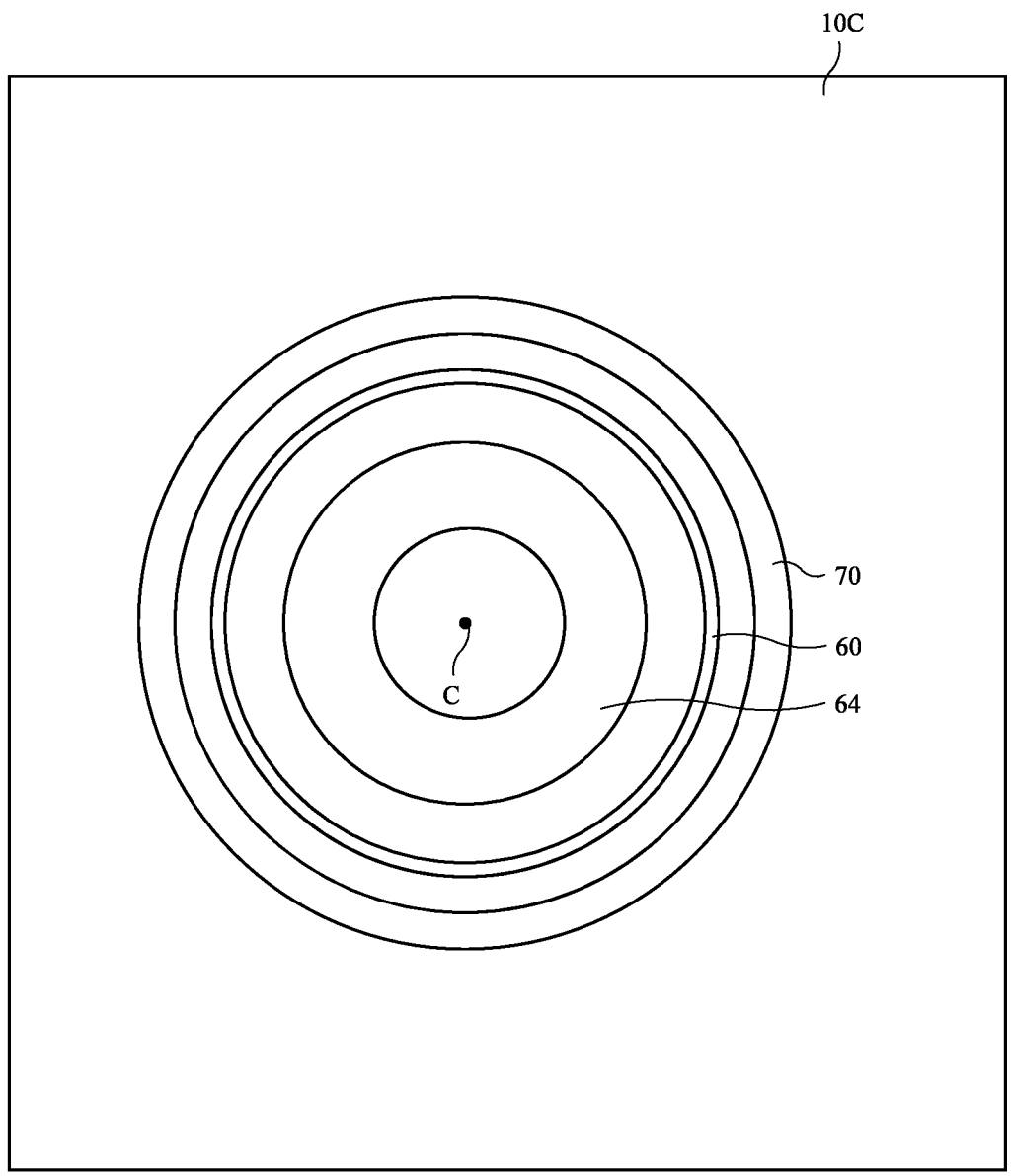
FIG. 6C is a top (plan) view of an illustrative electronic device having a wireless charging coil, a near-field communications (NFC) antenna, and a soft magnetic ring in accordance with some embodiments.

FIG. 6C is a top (front) view showing wireless charging coil 64, NFC antenna 60, and soft magnetic ring 70 in an illustrative device 10C. Coil 64 may be ring-shaped (sometimes referred to as an annular coil or circular coil) and may have a central opening with one or more magnetic cores optionally formed in the central opening. Ring-shaped NFC antenna 60 may laterally surround coil 64. NFC antenna 60 may sometimes be described as annular or circular. Soft magnetic ring 70 may laterally surround NFC antenna 60. Ring 70 may also sometimes be described as annular or circular. In FIG. 6C, coil 64, antenna 60, and soft magnetic ring 70 are concentric (e.g., each structure 64, 60, and 70 has a center coinciding at point C). Antenna 60 runs along a peripheral (outer) edge of wireless charging coil 64. Ring 70 runs along a peripheral (outer) edge of NFC antenna 60. Ring 70 may have a width W that is similar to the width of magnets 20 within devices 10A and 10B.

The example of FIG. 6C in which NFC antenna 60 is disposed between coil 64 and ring 70 within device 10C is merely illustrative. As another example, the position of ring 70 and NFC antenna 60 can be swapped such that ring 70 is interposed between coil 64 and antenna 60. As another example, the position of coil 64 and NFC antenna 60 can be swapped such that coil 64 is interposed between antenna 60 and ring 70. As another example, coil 64 may surround ring 70 while the NFC antenna 60 surrounds coil 64 such that ring 70 runs along an inner peripheral edge of coil 64. As another example, the position of coil 36 and magnet 20 can be swapped such that coil 36 runs along an outer peripheral edge of NFC antenna 60. As yet another example, ring 70 may surround NFC antenna 60 while coil 64 surrounds ring 70 such that ring 70 is interposed between an outer peripheral edge of NFC antenna 60 and an inner peripheral edge of coil 64. If desired, other non-concentric arrangements can also be used. In other suitable embodiments, the wireless charging coil, NFC antenna structure, and the soft magnetic flux shunting ring structure may be oval, triangular, rectangular, pentagonal, hexagonal, octagonal, or have another polygonal footprint.

The example of FIGS. 6A-6C in which a removable battery case 10B is interposed between devices 10A and 10B to prevent magnets 20 from repelling one another is merely illustrative. In accordance with another embodiment, a device such as accessory 10D can also include a soft magnetic ring 70 surrounding an NFC antenna 60. Accessory 10D may be a removable case that does not include any wireless charging coil or battery. Device 10D has a housing with a recess R and/or other structures configured to receive an electronic device 10. A user may removably attach a device 10 to accessory 10D so that devices 10 and 10D are used together as a portable unit. This example in which device 10D has a protruding lip portion 69 shaped to receive the rear face of a device 10 is merely illustrative. In other embodiments, device 10D may lack protruding portion 69 and may magnetically attach to device 10 using soft magnetic ring 70. A device 10 that is attached to accessory 10D having ring 70 can be mated with another device 10 in a back-to-back configuration to perform bidirectional wireless charging operations.

Figure 7:
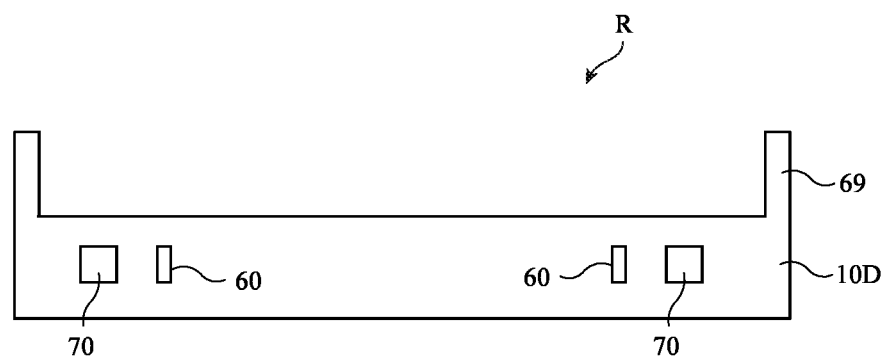
FIG. 7 is a cross-sectional side view of an illustrative accessory having a soft magnetic ring in accordance with some embodiments.
Figure 8:
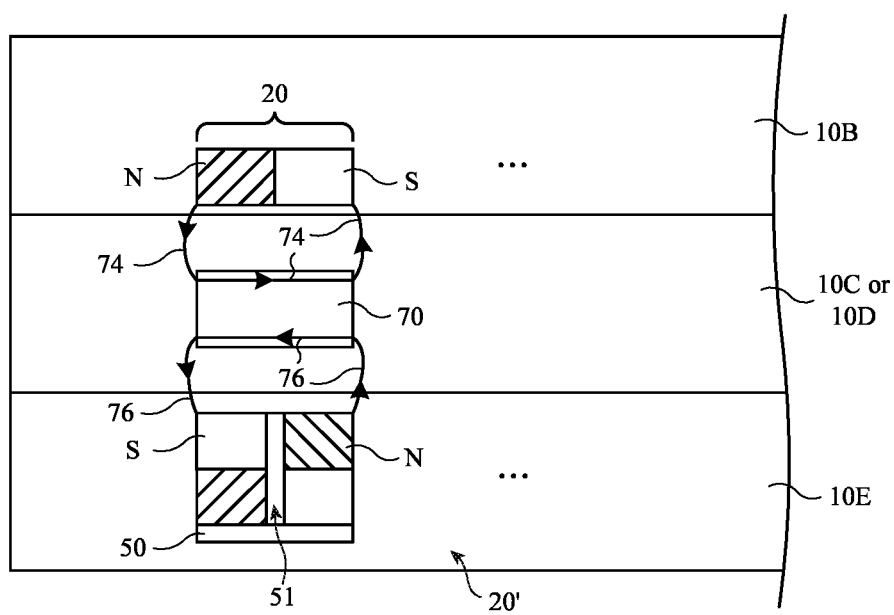
FIG. 8 is a cross-sectional side view of an illustrative accessory having a soft magnetic ring interposed between an electronic device and a wireless charging puck in accordance with some embodiments.

FIG. 8 is a cross-sectional side view showing device 10B attached to an accessory (e.g., accessory 10C of the type shown in FIG. 6A or accessory 10D of the type shown in FIG. 7) to form a portable unit, which is placed on device 10E (e.g., a wireless charging puck or mat). Device 10B may include magnet 20 of the type described in connection with FIGS. 4A and 4B, which has an outer ring area OR with north polarity and an inner ring area IR with south polarity. Device 10E may include magnet 20' of the type described in connection with FIGS. 5A and 5B, which has an outer ring area OR with an exposed pole of south polarity and an inner ring area IR with an exposed pole of north polarity.

The accessory (e.g., device 10C or 10D) stacked between devices 10B and 10E includes ring 70 formed using soft magnetic material(s) with high relative permeability and high saturation flux density, which enables ring 70 to block and short out (shunt) magnetic flux emanating from magnets 20 and 20' while providing magnetic/mechanical attraction forces between ring 70 and magnets 20 and 20'. As shown in FIG. 8, ring 70 in the interposing accessory device is used to shunt magnetic flux from magnet 20 within device 10B and from magnet 20' within device 10E. Operated in this way, the wireless charging coil in device 10B will be properly aligned with the wireless charging coil in device 10E so that device 10E can transmit wireless power to device 10B with optimal efficiency. Soft magnetic ring 70 may therefore sometimes be referred to as a magnetic flux shunting (shorting) structure or a magnetic field shunting (shorting) structure.

Magnetic fields 74 from magnet 20 in device 10B will be shorted (shunted) by soft magnetic ring 70 (e.g., magnetic field line 74 originating from the north pole of magnet 20 travels downward towards an outer peripheral edge of ring 70, travels along the width of ring 70 towards the center of the accessory before exiting an inner peripheral edge of ring 70, and then travels upward towards the south pole of magnet 20). Similarly, magnetic fields 76 from magnet 20' in device 10E will also be shorted (shunted) by soft magnetic ring 70 (e.g., magnetic field line 76 originating from the exposed north pole of magnet 20' travels upward towards the inner peripheral edge of ring 70, travels along the width of ring 70 away from the center of the accessory before exiting the outer peripheral edge of ring 70, and then travels downwards toward the exposed south pole of magnet 20').

Figure 9:
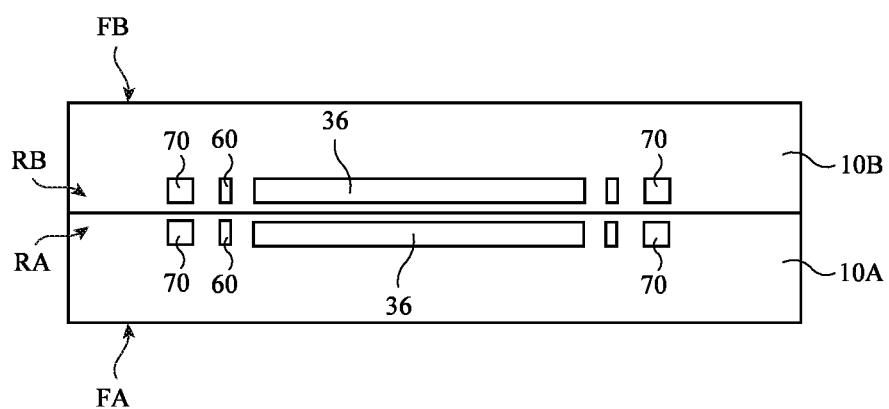
FIG. 9 is a cross-sectional side view of illustrative first and second electronic devices each having a soft magnetic ring and operated in a back-to-back configuration for wireless power transfer in accordance with some embodiments.

The embodiments of FIG. 6-8 in which soft magnetic ring 70 is formed within an accessory that can be interposed between two devices 10 that each include a permanent (hard) magnet is merely illustrative. FIG. 9 shows another suitable embodiment in which devices 10A and 10B (e.g., cellular telephones of the same type or model) each include a soft magnetic ring 70 instead of magnet 20 of the type shown in FIGS. 4A and 4B and are stacked in a back-to-back configuration. As shown in FIG. 9, device 10A has a rear face RA facing the rear face RB of device 10B.

Similar to ring 70 described in connection with FIGS. 6-8, rings 70 within devices 10A and 10B are formed from soft magnetic materials characterized by a high relative permeability (e.g., a relative permeability of 500 or more, 500-1000, more than 1000, more than 10,000, or more than 100,000) and high saturation flux density (e.g., a saturation flux density of at least 0.5 T, 0.5-1 T, 1-2 T, or more than 2 T). As examples, ring 70 may be formed from soft ferromagnetic and/or soft ferrimagnetic materials, which may include pure iron annealed in hydrogen, pure iron without annealing, nickel, cobalt, nickel-plated steel, soft ferrite, steel, silicon steel (e.g., an iron alloy with 3-4% silicon), low carbon steel (e.g., an iron alloy with 0.2-0.4% carbon, soft nanocrystalline material, mu-metal, permalloy, some combination of these materials, and/or other suitable soft magnetic material with high relatively permeability and high saturation flux density.

Since ring 70 of device 10A and ring 70 of device 10B are both soft magnetic structures that do not retain any magnetism in the absence of applied magnetic fields from a DC magnet, rings 70 will not repel each other when devices 10A and 10B are stacked in the back-to-back configuration. Since rings 70 are demagnetized in this state, there will be no magnetic attraction forces between devices 10A and 10B, and the user will need to manually align devices 10A and 10B to ensure that the wireless charging coils 36 are aligned for optimal wireless power transfer.

Wireless charging coil 36, NFC antenna 60, and soft magnetic ring 70 within each of devices 10A and 10B may be concentric (annular) structures. The example of FIG. 9 in which NFC antenna 60 is disposed between coil 36 and ring 70 within devices 10A and 10B is merely illustrative. As another example, the position of ring 70 and NFC antenna 60 can be swapped such that ring 70 is interposed between coil 36 and antenna 60. As another example, the position of coil 36 and NFC antenna 60 can be swapped such that coil 36 is interposed between antenna 60 and ring 70. As another example, coil 36 may surround ring 70 while the NFC antenna 60 surrounds coil 36 such that ring 70 runs along an inner peripheral edge of coil 36. As another example, the position of coil 36 and ring 70 can be swapped such that coil 36 runs along an outer peripheral edge of NFC antenna 60. As yet another example, ring 70 may surround NFC antenna 60 while coil 36 surrounds ring 70 such that ring 70 is interposed between an outer peripheral edge of NFC antenna 60 and an inner peripheral edge of coil 36. If desired, other non-concentric arrangements can also be used. In other suitable embodiments, coil 36, NFC antenna 60, and ring 70 may be oval, triangular, rectangular, pentagonal, hexagonal, octagonal, or have another polygonal footprint.

Figure 10A:
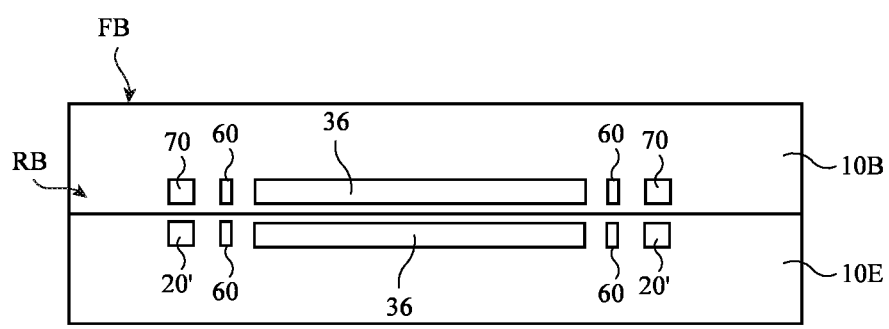
FIG. 10A is a cross-sectional side view of an illustrative electronic device having a soft magnetic ring mounted on a wireless charging puck in accordance with some embodiments.

Device 10B with a soft magnetic ring 70 is compatible with power transmitting devices or even accessories with magnets. FIG. 10A shows device 10B (e.g., a cellular telephone) with a soft magnetic ring 70 mounted on device 10E (e.g., a wireless charging puck). As shown in FIG. 10A, device 10B has a rear face RB that is placed on the top charging surface of device 10E. Device 10E includes magnet 20' (see, e.g., magnet 20' of the type described in connection with FIGS. 5A and 5B). When device 10B is mounted on top of device 10E, magnet 20' will emit magnetic flux that magnetizes ring 70. As a result, ring 70 will be magnetically attracted to magnet 20' to align wireless charging coils 36 of devices 10E and 10B while power transmitting device 10E is conveying wireless power to power receiving device 10B.

Figure 10B:
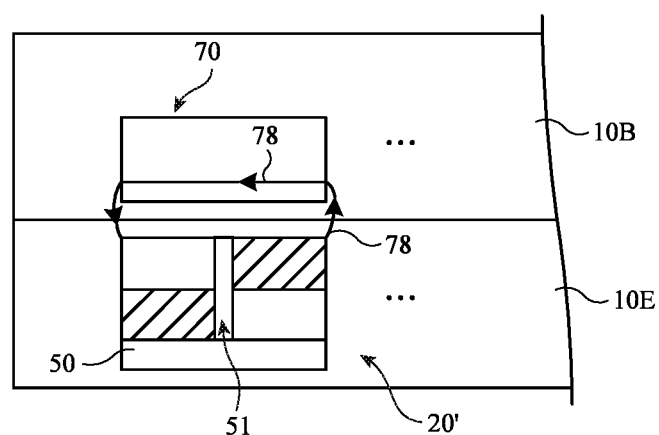
FIG. 10B shows how the soft magnetic ring within the electronic device of FIG. 10A is used to shunt magnetic flux from magnets within the wireless charging puck in accordance with some embodiments.

FIG. 10B is a cross-sectional side view showing how soft magnetic ring 70 in device 10B is used to shunt magnetic flux from magnet 20' within electronic device 10E when device 10B is mounted on top of device 10E. Operated in this way, the wireless charging coil in device 10B will be properly aligned with the wireless charging coil in device 10E during wireless charging operations. As shown in FIG. 10B, magnetic fields 78 from magnet 20' will be shorted (shunted) by soft magnetic ring 70 (e.g., magnetic field line 78 originating from the exposed north pole of magnet 20' travels upward towards an inner peripheral edge of ring 70, travels along the width of ring 70 away from the center of device 10B before exiting an outer peripheral edge of ring 70, and then travels downward towards the exposed south pole of magnet 20').

In general, soft magnetic ring 70 may be incorporated into any device with a wireless charging coil, any device with a battery, or any accessory with or without a battery so that ring 70 can be used to shunt magnetic flux from a nearby magnet while providing magnetic attraction forces to properly aligned two mating devices or accessories.

The foregoing is merely illustrative and various modifications can be made to the described embodiments. The foregoing embodiments may be implemented individually or in any combination.

What is claimed is:

1. An electronic device operable with an external device having a magnet, comprising:
   a wireless power transfer coil;
   a rectifier coupled to the wireless power transfer coil;
   a battery coupled to the rectifier; and
   a soft magnetic ring concentric with the wireless power transfer coil, wherein the soft magnetic ring shunts magnetic flux from the magnet in the external device when the external device is mated with the electronic device.

2. The electronic device of claim 1, further comprising:
   a near-field communications antenna concentric with the wireless power transfer coil.

3. The electronic device of claim 1, wherein:
   the external device has an additional wireless power transfer coil; and
   the soft magnetic ring is attracted to the magnet in the external device to align the wireless power transfer coil and the additional wireless power transfer coil when the external device is mated with the electronic device.

4. The electronic device of claim 1, wherein the soft magnetic ring shunts magnetic flux from an additional magnet in an additional external device while the external device is mated at a first surface of the electronic device and while the additional external device is mated at a second surface of the electronic device opposing the first surface to prevent the magnet from repelling the additional magnet.

5. The electronic device of claim 4, wherein:
   the external device has a front face with a display and a rear face opposing its front face;
   the rear face of the external device is mated with the first surface of the electronic device;
   the additional external device has a front face with a display and a rear face opposing its front face; and
   the rear face of the additional external device is mated with the second surface of the electronic device.

6. The electronic device of claim 5, wherein:
   during a first wireless charging mode, the wireless power transfer coil is configured to convey wireless power from the external device to the additional external device; and
   during a second wireless charging mode, the wireless power transfer coil is configured to convey wireless power from the additional external device to the external device.

7. The electronic device of claim 1, wherein the soft magnetic ring neither repels nor attracts an additional soft magnetic ring in an additional external device when the additional external device is mated with the electronic device.

8. The electronic device of claim 1, wherein the soft magnetic ring is formed from a material having a relative permeability of at least 1000.

9. The electronic device of claim 1, wherein the soft magnetic ring is formed from a soft magnetic material selected from the group consisting of: iron, nickel, cobalt, steel, ferrite, steel, nanocrystalline material, mu-metal, and permalloy.

10. The electronic device of claim 1, wherein the soft magnetic ring is formed from a material having a saturation flux density of at least 0.5 Tesla.

11. An accessory operable with an electronic device, comprising:
    a housing having a face configured to receive the electronic device having a magnet; and
    a soft magnetic ring configured to shunt magnetic flux from the magnet when the electronic device is received at the face of the housing.

12. The accessory of claim 11, further comprising:
    an annular near-field communications antenna disposed adjacent to the soft magnetic ring.

13. The accessory of claim 11, further comprising:
    at least one wireless power transfer coil concentric with the soft magnetic ring and configured to transmit or receive wireless power from an additional wireless power transfer coil in the electronic device;

a rectifier coupled to the wireless power transfer coil; and a load configured to receive a rectified voltage from the rectifier.

14. The accessory of claim 11, wherein the soft magnetic ring is formed from a material having a relative permeability of at least 1000.

15. The accessory of claim 11, wherein the soft magnetic ring is formed from a soft magnetic material selected from the group consisting of: iron, nickel, cobalt, steel, ferrite, steel, nanocrystalline material, mu-metal, and permalloy.

16. A system comprising:

an electronic device having a magnet, a wireless power transfer coil, and a battery; and an accessory operable to mate with the electronic device, wherein the accessory includes a soft magnetic ring configured to shunt magnetic flux from the magnet when the electronic device is mated with the accessory.

17. The system of claim 16, further comprising:

a power transmitting device operable to mate with the electronic device or the accessory, wherein the power transmitting device comprises an additional magnet, and wherein the soft magnetic ring is configured to shunt magnetic flux from the additional magnet when the power transmitting device is mated with the accessory.

18. The system of claim 16, wherein the electronic device further comprises a soft magnetic ring concentric with the wireless power transfer coil.

19. The system of claim 18, further comprising:

an additional electronic device operable to mate with the electronic device, wherein the additional electronic device includes a magnet, a wireless power transfer coil, a battery, and a soft magnetic ring, and wherein wireless power is conveyed between the electronic device and the additional electronic device when the additional electronic device is mated with the electronic device.

20. The system of claim 16, wherein:

the electronic device further comprises a near-field communications antenna concentric with the wireless power transfer coil; and the accessory comprises a near-field communications antenna concentric with the soft magnetic ring.

* * * * *

UNITED STATES PATENT AND TRADEMARK OFFICE
CERTIFICATE OF CORRECTION

| | |
|---|---|
| PATENT NO. | : 12,095,279 B2 |
| APPLICATION NO. | : 18/512864 |
| DATED | : September 17, 2024 |
| INVENTOR(S) | : Jeffrey D. Louis |

It is certified that error appears in the above-identified patent and that said Letters Patent is hereby corrected as shown below:

In the Claims

Column 14, Line 50, "steel, ferrite, steel, nanocrystalline material" should read -- steel, ferrite, nanocrystalline material --

Column 15, Lines 11-12, "steel, ferrite, steel, nanocrystalline material" should read -- steel, ferrite, nanocrystalline material --

Signed and Sealed this
Twelfth Day of November, 2024

Katherine Kelly Vidal
*Director of the United States Patent and Trademark Office*